(No Model.)
W. M. LOVIN.
SEEDER.
No. 335,709. Patented Feb. 9, 1886.
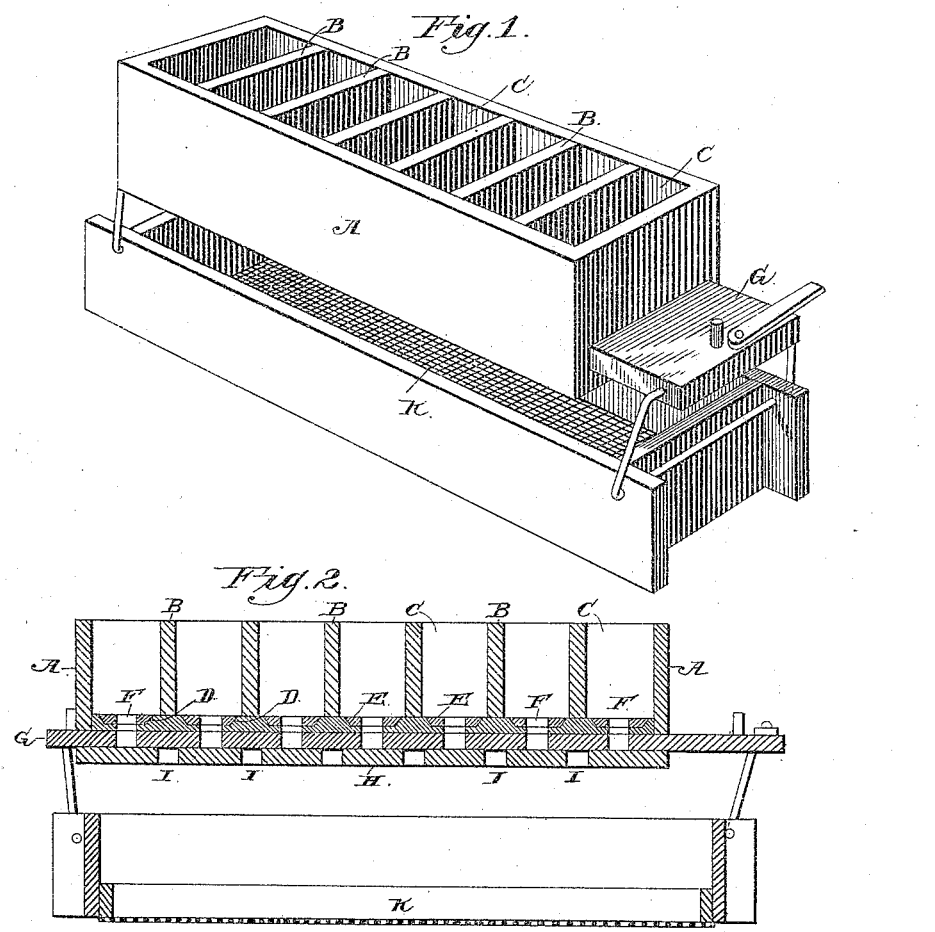
WITNESSES
M. E. Fowler
J. W. Garner
INVENTOR
William M. Lovin
By C. M. Crowther
Attorneys

UNITED STATES PATENT OFFICE.

WILLIAM MILTON LOVIN, OF GREENVILLE, TEXAS.

SEEDER.

SPECIFICATION forming part of Letters Patent No. 335,709, dated February 9, 1886.

Application filed October 21, 1885. Serial No. 180,529. (No model.)

*To all whom it may concern:*

Be it known that I, WILLIAM M. LOVIN, a citizen of the United States, residing at Greenville, in the county of Hunt and State of Texas, have invented a new and useful Improvement in Seeders, of which the following is specification, reference being had to the accompanying drawings.

My invention relates to an improvement in seeders; and it consists in the combination of the seed-hopper, the reciprocating seed-slide, and a sieve or screen suspended from the seed-slide and reciprocating therewith for sowing the seeds broadcast, as will be more fully set forth hereinafter.

In the drawings, Figure 1 is a perspective view of the hopper and broadcasting attachment to a seeder embodying my invention. Fig. 2 is a vertical longitudinal sectional view of the same.

A represents the hopper of a seeding-machine, which is provided with a series of transverse partitions, B, by which the hopper is divided into a number of compartments, C. By thus dividing the hopper into a number of compartments the seeds therein are prevented from settling in one end of the hopper when sowing a hillside, and thereby sowing the seeds irregularly. The false bottom of the hopper is provided with a series of countersunk openings, D, in which are placed plates E, having openings F, that may be of any suitable size, according to the kind of seeds desired to be planted. For large seeds plates having large openings will be employed, and for small seeds plates having small openings will be used.

G represents a seed-slide of the usual construction, that is placed between the bottom H and the false bottom of the hopper, and is reciprocated by any suitable mechanism, which is not here shown or more particularly described, as it may be of any preferred construction and forms no part of my invention. The bottom of the hopper has a series of openings, I, out of line with the openings in the false bottom thereof.

K represents a sieve or screen, which is suspended from the ends of the seed-slide below the hopper and reciprocates with the seed-slide. This sieve or screen may be attached to the seed-slide in any suitable manner, and is for the purpose of sowing or scattering the seeds broadcast as they are fed from the hopper by the seed-slide. A broadcasting attachment for a seeder thus constructed is cheap and simple and is very efficient and reliable in operation.

Having thus described my invention, I claim—

The combination, in a seeder, of the seed-hopper, the reciprocating seed-slide, and the sieve or screen suspended from the seed-slide below the hopper, substantially as described.

In testimony that I claim the foregoing as my own I have hereto affixed my signature in presence of two witnesses.

WILLIAM MILTON LOVIN.

Witnesses:
SID GRIER,
T. E. BYRD.